United States Patent [19]

Boogerman et al.

[11] Patent Number: 4,848,951
[45] Date of Patent: Jul. 18, 1989

[54] KEYED SHAFT COUPLING

[75] Inventors: Allan A. Boogerman, Rexford, N.Y.; Lawrence L. Lanerd, Loretto, Minn.

[73] Assignee: Graco Inc., Minneapolis, Minn.

[21] Appl. No.: 233,120

[22] Filed: Aug. 11, 1988

[51] Int. Cl.[4] ............................................. F16B 1/00
[52] U.S. Cl. .................................... 403/24; 403/344; 403/356
[58] Field of Search ............... 403/344, 356, 373, 312, 403/13, 14, 24

[56] References Cited

U.S. PATENT DOCUMENTS

| | | | |
|---|---|---|---|
| 298,398 | 5/1884 | Osborn | 403/309 |
| 4,068,965 | 1/1978 | Lichti | 403/356 X |
| 4,428,697 | 1/1984 | Ruland | 403/344 |

FOREIGN PATENT DOCUMENTS 1427010  3/1976  United Kingdom ................. 403/14

Primary Examiner—Andrew V. Kundrat
Attorney, Agent, or Firm—Douglas B. Farrow

[57] ABSTRACT

A coupling is designed for use in connecting two shafts such as, for instance, the output shaft of an engine with the input shaft of a pump or similar device. The coupling is formed from a generally cylindrical body having a central bore, the bore having a keyway therein. Dyametrically opposed from the keyway, a radial split is formed in the body of the coupler and the split is bridged and releasably tightenable by one or more bolts or other such fasteners.

1 Claim, 1 Drawing Sheet

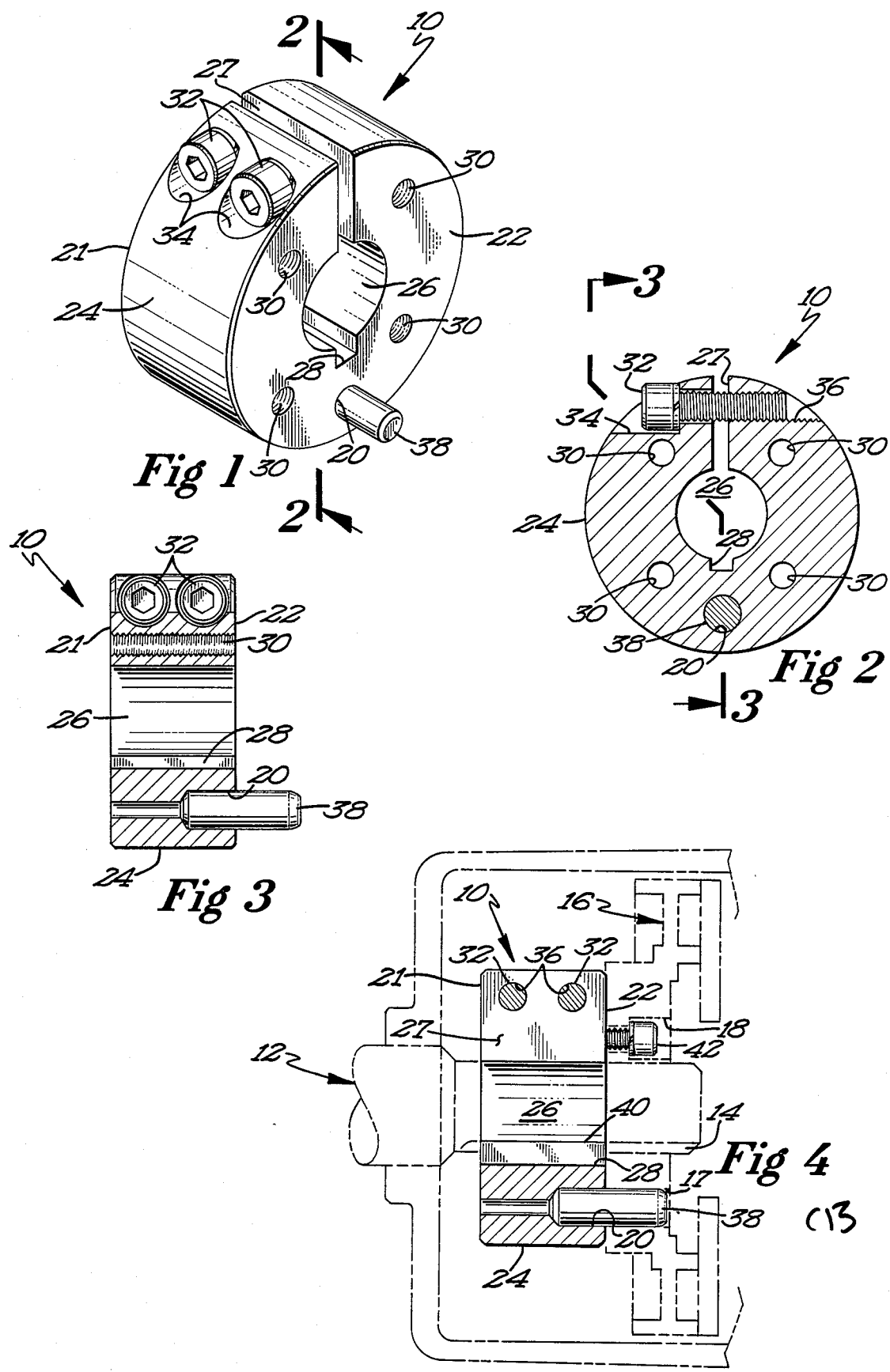

KEYED SHAFT COUPLING

BACKGROUND OF THE INVENTION

Various types of shaft couplers have been known for many years. In particular, small gasoline engines are typically provided with a shaft having a keyway therein for receipt of a key which in turn interlocks with a coupler having a corresponding bore and keyway therein. Typically, the coupler has a set screw which bears against the key to lock the coupler to the shaft. Such devices tend to loosen and shear the key or otherwise hurt the integrity of the coupling when subjected to high loads, particularly when such loads are varying in nature.

It is therefore an object of this invention to provide a coupler for keyed shafts which is effective in high loads which vary in magnitude and which may be easily and inexpensively manufactured.

SUMMARY OF THE INVENTION

A shaft coupler is provided with a generally cylindrical body having a central axial bore. A split extends radially outwardly through one wall of the coupling and that split may be compressed about the shaft passing through the central bore by means of one or more fasteners extending across the split. The split is diametrically opposed to the keyway which receives the key which in turn interlocks with the keyway on the shaft. A clutch or other such device may be bolted to one face of the coupler.

There and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a perspective view of the instant invention.
FIG. 2 is a sectional view taken along line 2—2 of FIG. 1.
FIG. 3 is a sectional view taken along line 3—3 of FIG. 2.
FIG. 4 is a cutaway view showing the instant invention applied to a shaft and having a clutch mounted thereon.

DESCRIPTION OF THE PREFERRED EMBODIMENT

The coupler of the instant invention, generally designated 10, is designed for mounting on a first shaft 12 having a keyway 14 therein. The typical application, the first shaft 12 extends from an engine such as a gasoline engine and is typically provided with the keyway 14. Coupler 10 may also be attached to clutch 16 having a plurality of bolt holes 18 therein and a hole 17 for receipt of an alignment pin.

Coupler 10 is generally cylindrical in shape and has first and second faces 21 and 22 respectively as well as an outer circumference 24. Coupler 10 further is provided with a central axial bore 26 having a keyway 28 as well. Face 22 has a plurality of clutch bolt holes 30 located therein for fasteneing to clutch 16 as well as a hole 20 for receipt of alignment pin 38.

In the preferred embodiment, two clamping bolts 32 are provided and are located in counter bores 34 and threaded holes 36 on either side of split 27 which extends radially outwardly from central bore 26.

Alignment pin 38 acts to align coupler 10 and clutch 16 and is further secured in place by clutch bolts 42. In mounting coupler 10 on first shaft 12, key 40 is placed in engine shaft keyway 14. Key 40 is then aligned with coupler keyway 28 and coupler 10 pressed over engine shaft 12 until it has reached the proper position at which point clamping bolts 32 are tightened. This provides a relatively trouble free coupler which is suitable for imposition of reasonably high alternating and otherwise varying loads.

It is contemplated that various changes and modifications may be made to the coupler without departing from the spirit and scope of the invention as defined by the following claims.

What is claimed is:

1. A rotating shaft coupler for coupling a first shaft having a keyway to a second shaft, said coupler comprising:
   a body;
   a clutch attached to said second shaft;
   a bore extending at least partially through said body;
   a keyway in said bore sized and located to accomodate and retain a key in combination with said first shaft keyway
   means for attaching said body to said clutch comprising a plurality of bolts; and
   at least one smooth surfaced pin snugly received in bores in said body and said clutch; and
   means for clamping said coupler to said first shaft, said clamping means comprising;
   a split in said body located diametrically opposite said bore from said keyway; and
   at least one releasable fastener extending across said split, said fastener being recessed in said body wherein said bore has a diameter at least as large as said first shaft when each said fastener is loose and said bore has a diameter less than said first shaft when each said fastener is tightened.

* * * * *